(12) United States Patent
Haering et al.

(10) Patent No.: US 7,949,150 B2
(45) Date of Patent: May 24, 2011

(54) AUTOMATIC CAMERA CALIBRATION AND GEO-REGISTRATION USING OBJECTS THAT PROVIDE POSITIONAL INFORMATION

(75) Inventors: Niels Haering, Reston, VA (US);
Zeeshan Rasheed, Sterling, VA (US);
Khurram Hassan-Shafique, Ashburn, VA (US); Asaad Hakeem, Ashburn, VA (US); Omar Javed, Herndon, VA (US);
Xiao Chun Cao, Reston, VA (US);
Haiying Liu, Chantilly, VA (US); Li Yu, Herndon, VA (US); Donald G. Madden, Falls Church, VA (US); Andrew J. Chosak, Arlington, VA (US); Geoffrey Taylor, Reston, VA (US); Himaanshu Gupta, Reston, VA (US); Alan J. Lipton, Herndon, VA (US)

(73) Assignee: ObjectVideo, Inc., Reston, VA (US)

( * ) Notice: Subject to any disclaimer, the term of this patent is extended or adjusted under 35 U.S.C. 154(b) by 1058 days.

(21) Appl. No.: 11/730,518

(22) Filed: Apr. 2, 2007

(65) Prior Publication Data
US 2008/0240616 A1    Oct. 2, 2008

(51) Int. Cl.
*G06K 9/00* (2006.01)
*H04N 5/225* (2006.01)
(52) U.S. Cl. .................... 382/103; 348/169
(58) Field of Classification Search ................ 382/103, 382/107, 104, 294; 348/169, 170, 172, 173, 348/174, 143, 171; 342/444, 357.22, 357.24, 342/357.39, 357.44; 386/227; 701/213, 701/215; 702/85
See application file for complete search history.

(56) References Cited

U.S. PATENT DOCUMENTS

| | | | |
|---|---|---|---|
| 5,581,257 A * | 12/1996 | Greene et al. | 342/51 |
| 6,233,523 B1 * | 5/2001 | Sood | 701/213 |
| 6,639,553 B2 * | 10/2003 | Lin et al. | 342/444 |
| 6,998,987 B2 | 2/2006 | Lin et al. | |
| 6,999,600 B2 * | 2/2006 | Venetianer et al. | 382/103 |
| 7,154,395 B2 * | 12/2006 | Raskar et al. | 340/572.4 |
| 7,460,830 B2 * | 12/2008 | Moore, III | 455/13.2 |
| 2005/0060339 A1 | 3/2005 | McGee et al. | |
| 2005/0099887 A1 * | 5/2005 | Zimmerman et al. | 367/12 |
| 2005/0146605 A1 | 7/2005 | Lipton et al. | |
| 2005/0162515 A1 | 7/2005 | Venetianer et al. | |
| 2005/0207617 A1 | 9/2005 | Sarnoff et al. | |
| 2006/0268111 A1 | 11/2006 | Zhang et al. | |
| 2007/0040744 A1 | 2/2007 | Zimmerman et al. | |

OTHER PUBLICATIONS

Collins et al., "A System for Video Surveillance and Monitoring: VSAM Final Report," Technical Report CMU-RI-TR-00-12, Robotics Institute, Carnegie Mellon University, May 2000.
Hartley, et al., "Multiple View Geometry in Computer Vision," Cambridge Press, Second Edition, 2003, pp. 107-110.
Maritime Safety Committee, Addendum 1 of Resolution MSC.74 (69), May 12, 1998. A Bayesian Approach to Bandwidth Selection for Multivariate Kernel Density Estimation, by Zhang, X., et al., Computational Statistics and Data Anaylsis, 50(11), 3009-3031.
http://en.wikipedia.org/wiki/RANSAC, last accessed Dec. 7, 2006, pp. 1-3.
Nttp://en.wikipedia.org/wiki/Parzen_window, last accessed Dec. 6, 2006, pp. 1-2.

* cited by examiner

*Primary Examiner* — Abolfazl Tabatabai
(74) *Attorney, Agent, or Firm* — Venable LLP; Michael A. Sartori; Kyle D. Petaja (57) ABSTRACT

A video sequence of a field of view within an environment is received. Targets are detected in the video sequence. Target geo-positional information is received. Correspondences between the targets detected in the video sequence and the target geo-positional information are determined and used to calibrate the camera and to geo-register a field of view of the camera.

42 Claims, 9 Drawing Sheets

AUTOMATIC CAMERA CALIBRATION AND GEO-REGISTRATION USING OBJECTS THAT PROVIDE POSITIONAL INFORMATION

CROSS-REFERENCE TO RELATED PATENTS AND PATENT PUBLICATIONS

The following patent and patent publications, the subject matters of which are entirely incorporated herein by reference, are mentioned:

U.S. Pat. No. 6,999,600, entitled "Video Scene Background Maintenance Using Change Detection and Classification," by Venetianer, et al., issued Feb. 14, 2006;

U.S. Published Patent Application No. 2005/0146605, entitled "Video Surveillance System Employing Video Primitives," by Lipton et al., published Jul. 7, 2005;

U.S. Published Patent Application No. 2005/0162515, entitled "Video Surveillance System," by Venetianer et al., published Jul. 28, 2005; and U.S. Published Patent Application No. 2006/0268111, entitled "Multi-State Target Tracking," by Zhang et al., published Nov. 30, 2006.

FIELD OF THE INVENTION

The present invention relates to automatic camera calibration and geo-registration that may be used with video cameras and systems for, for example, video surveillance and/or monitoring.

BACKGROUND

Image-based systems are commonly used in different businesses and industries. These systems are composed of a video camera that obtains and records images within its sensory field. For example, a video camera provides a video record of whatever is within the field of view (FOV) of its lens. The obtained images may then be monitored by a human operator and/or reviewed later by a human operator. Recent progress has allowed such images to be monitored also by an automated system, improving performance and saving human labor.

Effective automatic analysis of the images requires knowledge of the video camera's intrinsic parameters, its geometry and relationship with other sensors, geographical location, and/or relationship of actual measurement of objects in the camera's field of view with other image counterparts. Current systems use error-prone manual sensor calibration processes to obtain such information, and are time consuming and labor intensive. In addition, maintaining calibration between sensors in a network is a daunting task, since a slight change in the position of a sensor requires the calibration process to be repeated. Further, the currently available auto-calibration techniques use image-based information solely and, hence, are limited in their application and reliability. In addition, these techniques are unable to perform calibration or geo-registration without manual intervention.

SUMMARY

One exemplary embodiment of the invention includes a computer-readable medium comprising software for video processing, which when executed by a computer system, cause the computer system to perform operations comprising a method of: receiving a video sequence of a field of view within an environment; detecting targets in the video sequence; receiving target geo-positional information transmitted by a geo-positional sensor; and determining correspondences between the targets detected in the video sequence and the target geo-positional information.

Another exemplary embodiment of the invention includes a computer-based system to perform a method for video processing, the method comprising: a computer-based system to perform a method for video processing, the method comprising: receiving a video sequence of a field of view within an environment; detecting targets in the video sequence; receiving target geo-positional information transmitted by a geo-positional sensor; and determining correspondences between the targets detected in the video sequence and the target geo-positional information.

Another exemplary embodiment of the invention includes a method for video processing comprising: receiving a video sequence of a field of view within an environment; detecting targets in the video sequence; receiving target geo-positional information transmitted by a geo-positional sensor; and determining correspondences between the targets detected in the video sequence and the target geo-positional information.

Another exemplary embodiment of the invention includes a system to perform video processing of a video sequence generated by at least one video camera having a field of view within an environment, comprising at least one of: a correspondence module to determine correspondences between targets detected in the video sequence and corresponding target geo-positional information transmitted by a geo-positional sensor; a calibration and geo-registration module to determine a relationship between the video camera and geo-positional sensor and geo-register the video camera based at least on the determined correspondences; or a metric rules and video understanding module to obtain measurement information regarding at least one of the environment or target detected in the video sequence.

BRIEF DESCRIPTION OF THE DRAWINGS

The foregoing and other features of various embodiments will be apparent from the following, more particular description of such embodiments, as illustrated in the accompanying drawings, wherein like reference numbers generally indicate identical, functionally similar, and/or structurally similar elements.

DEFINITIONS

In describing the invention, the following definitions are applicable throughout (including above).

"Video" may refer to motion pictures represented in analog and/or digital form. Examples of video may include: television; a movie; an image sequence from a video camera or other observer; an image sequence from a live feed; a computer-generated image sequence; an image sequence from a computer graphics engine; an image sequences from a storage device, such as a computer-readable medium, a digital video disk (DVD), or a high-definition disk (HDD); an image sequence from an IEEE 1394-based interface; an image sequence from a video digitizer; or an image sequence from a network.

A "video sequence" refers to some or all of a video.

A "video camera" may refer to an apparatus for visual recording. Examples of a video camera may include one or more of the following: a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan, tilt, zoom (PTZ) camera; and a video sensing device. A video camera may be positioned to perform surveillance of an area of interest.

"Video processing" may refer to any manipulation and/or analysis of video, including, for example, compression, editing, surveillance, and/or verification.

A "frame" may refer to a particular image or other discrete unit within a video.

An "Automatic Identification System (AIS) transmitter" may refer to a device that transmits positional data and identifying information regarding its carrier. The standard is defined by the International Maritime Organization and regulated by Safety of Life at Sea Conventions (SOLAS) amendment from Dec. 13, 2002, Chapter V, Regulation 19.2 (ISBN 928014183X).

A "Blue Force transponder" may refer to a device that transmits positional and identifying information about its carrier. The Blue Force transponder may transmit periodically or when requested.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; interpreted code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the described is not intended to be limited to the specific terminology so selected. A person skilled in the relevant art will recognize that other components and configurations may be used without parting from the spirit and scope of the described. It is to be understood that each specific element includes all technical equivalents that operate in a similar manner to accomplish a similar purpose. Each reference cited herein is incorporated by reference. The examples and embodiments described herein are non-limiting examples.

According to the exemplary embodiments, calibration and geo-registration parameters may be automatically obtained, maintained, and updated for one or more video cameras. The conventional approaches ignore the deluge of positional calibration information available today, which are provided by objects, such as, for example: cell phones; radio frequency identification (RFID) tags on or in, for example, trucks, forklifts, pallets, containers, products, and goods; automated identification system (AIS) transponders in ships; aircraft transponders; blue force transponders; and vehicles equipped with global positioning system (GPS), such as, for example, buses, taxis, cars, trucks, railroad cars and others. The ubiquity and abundance of this information may provide reliable and accurate auto-calibration and geo-registration for video cameras, even in environments where conventional image-based systems may fail to perform, such as in feature-less environments. The exploitation of the supplemental source of information may also enable the system to automatically handle changes in its geometry and perform geo-registration without requiring manual labor.

The following is directed to the automatic calibration and geo-registration of one or more video cameras by using the positional information provided by the objects in the environment. The calibration and geo-registration information may be provided in the form of parameters and geometric information of the video camera and video camera field of view. The calibration information may be used for image-based mensuration (i.e., the measurement of geometric quantities), and it may improve video understanding components, such as the target detector, the target tracker, or the target classifier by making, for example, absolute position, size, speed and heading information of the object available. The following may also improve detection of video events and threats by facilitating the mensuration of, for example, actual position, speed, heading, and sizes of moving targets, and estimated time of collision/impact.

Figure 1:
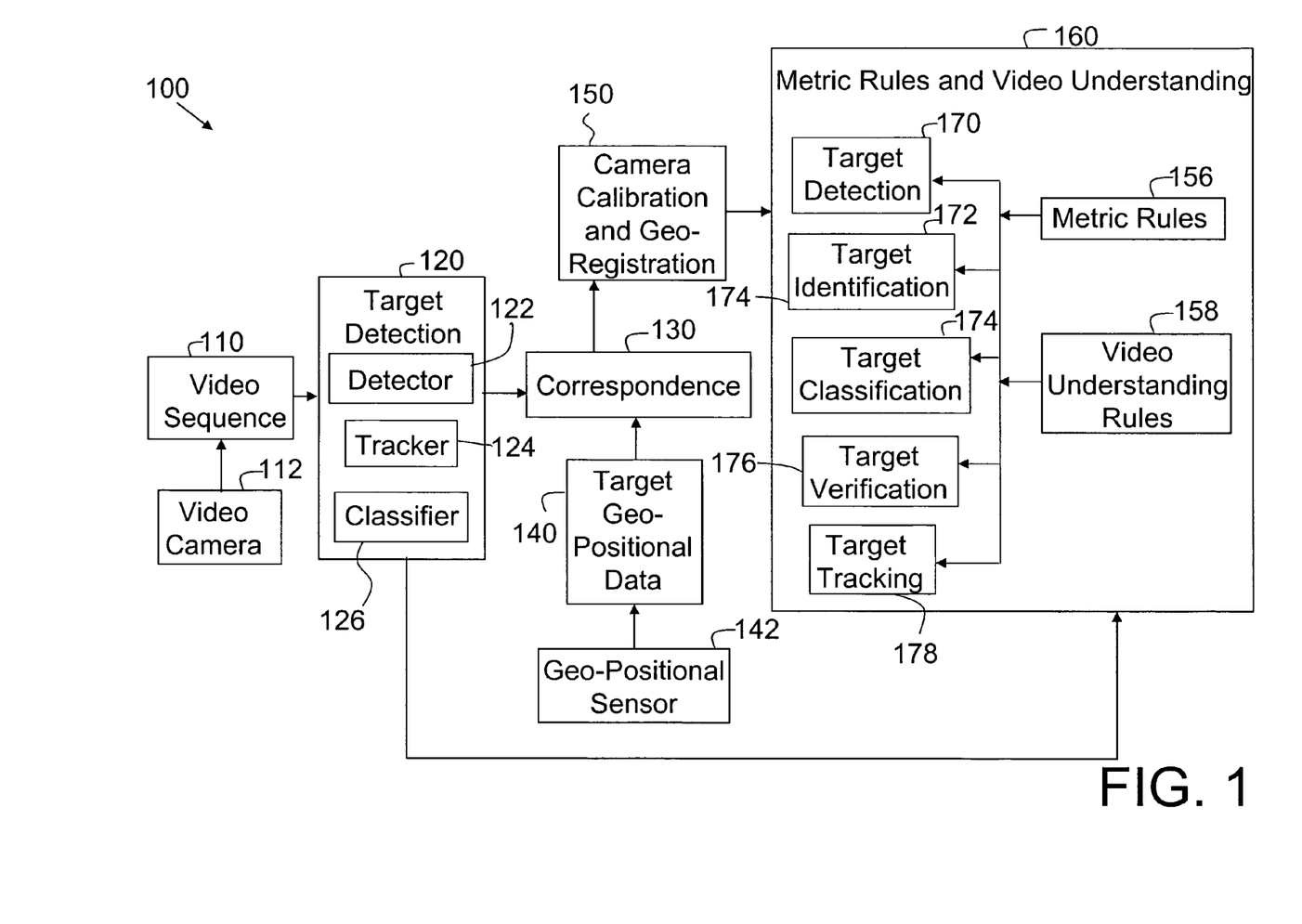
FIG. 1 illustrates an exemplary video processing system.

With reference to FIG. 1, in an imaging or video processing system 100, a video sequence or video sequence data 110 may be obtained from a video camera 112. Alternatively, the video sequence 110 may be prerecorded and obtained, for example, from an archive. A target detection module 120 may receive the video sequence 110 and detect, track and classify targets or events from the video sequence 110. A detector 122 may detect targets using a background detection method, described, for example, in U.S. Pat. No. 6,999,600, identified above. Targets may be tracked using a tracker 124, such as a Kalman filter, applied to the centroids of the targets, or using some other technique as described, for example, in U.S. Published Patent Application No. 2005/0146605, or U.S. Published Patent Application No. 2006/0268111, identified above. A classifier 126 may perform classification of the targets by a number of techniques. Examples of such techniques include using a neural network classifier and using a linear discriminatant classifier described, for example, in "A system for video surveillance and monitoring," by Collins et al., technical report CMU-RI-TR-00-12, Robotics Institute, Carnegie Mellon University, May, 2000. The output of the target detection module 120 is target meta information, such as, for example, the target's width, height, and/or size within the image, location within the image, motion within the image, color, shape, and class type.

As described in detail below, a correspondence module 130 may determine the correspondences between the targets detected in the video sequence 110 by the target detection module 120 and corresponding target geo-positional data 140, which may be obtained from a geo-positional sensor or sensors 142 associated with objects in the environment that provide such information. The correspondence module 130 may provide correspondence data, which may be used to calibrate and geo-register the video camera 112. A camera calibration and geo-registration module 150 may use the correspondences provided by the correspondence module 130 to provide the relationship between the video camera 112 and geo-positional sensor 142. Based on metric rules 156 and video understanding rules 158, a metric rules and video understanding module 160 may use the calibration and geo-registration information from the calibration and geo-registration module 150 and the target meta information from the target detection module 120 to analyze the video sequence 110, and geo-locate objects in the environment including identifying, classifying, verifying the objects, and the like.

Figure 2A:
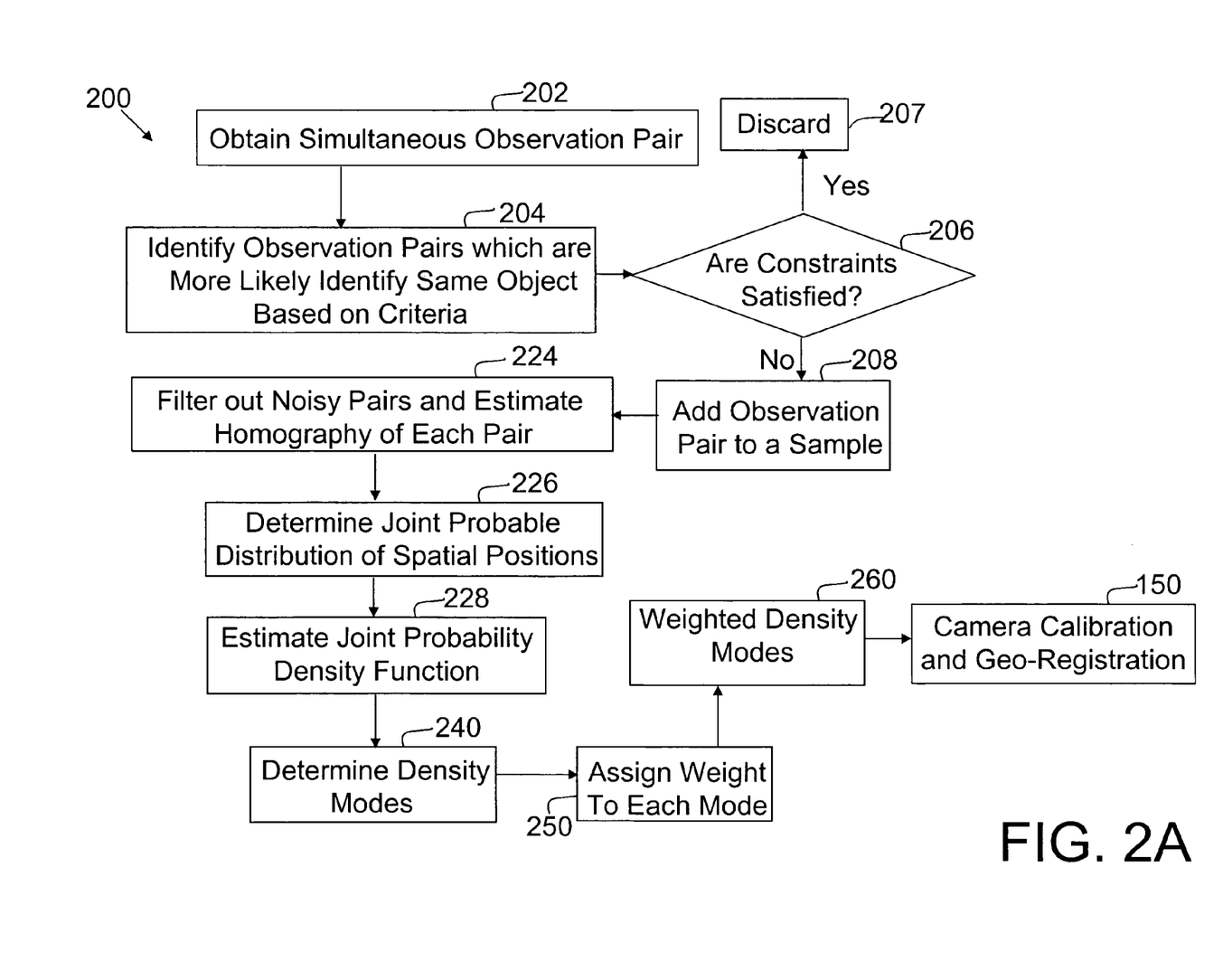
FIG. 2A illustrates an exemplary flowchart.

With continuing reference to FIG. 1 and further reference to FIG. 2A, the correspondence module 130 may be implemented by a technique 200. A pair of targets or objects contemporaneously observed in the video camera data and geo-positional sensor data may be corresponding or non corresponding objects. Thus, the simultaneous observations provide two mutually exclusive hypotheses: the observations either result from the same object, or the observations are accidentally associated. Subsequent topologically consistent pairs of observations support the first hypothesis and indicate that the observed pair may be the same target or object. Subsequent topologically inconsistent pairs of observations strengthen the second hypothesis, indicating that the original association was accidental.

Let VC and GS be the video camera data and geo-positional sensor data, respectively, provided by respective video camera 112 and geo-positional sensor 142. Each observation includes an observational spatial position $x=[x\ y]'$ in video camera or geo-positional sensor coordinate system. In block 202, the objects which are simultaneously observed in the video camera and geo-positional sensor data VC, GS may be obtained. For example, objects in the video camera data VC may be obtained from the video camera 112, and objects in the geo-positional sensor data GS may be obtained from the geo-positional sensor 142. In block 204, the pairs of objects, for which the first hypothesis has substantially more support than the second hypothesis, may be identified based on predetermined criteria.

In block 206, the spatial and spatiotemporal constraints for each observed pair may be verified. If the spatial and spatiotemporal constraints are satisfied, in block 207, the observed pair may be discarded. If the spatial and spatiotemporal constraints are not satisfied, in block 208, when the observation objects pair is simultaneously recorded in the video camera and geo-positional sensor data, the observed objects pair may be added to the sample C.

Figure 2B:
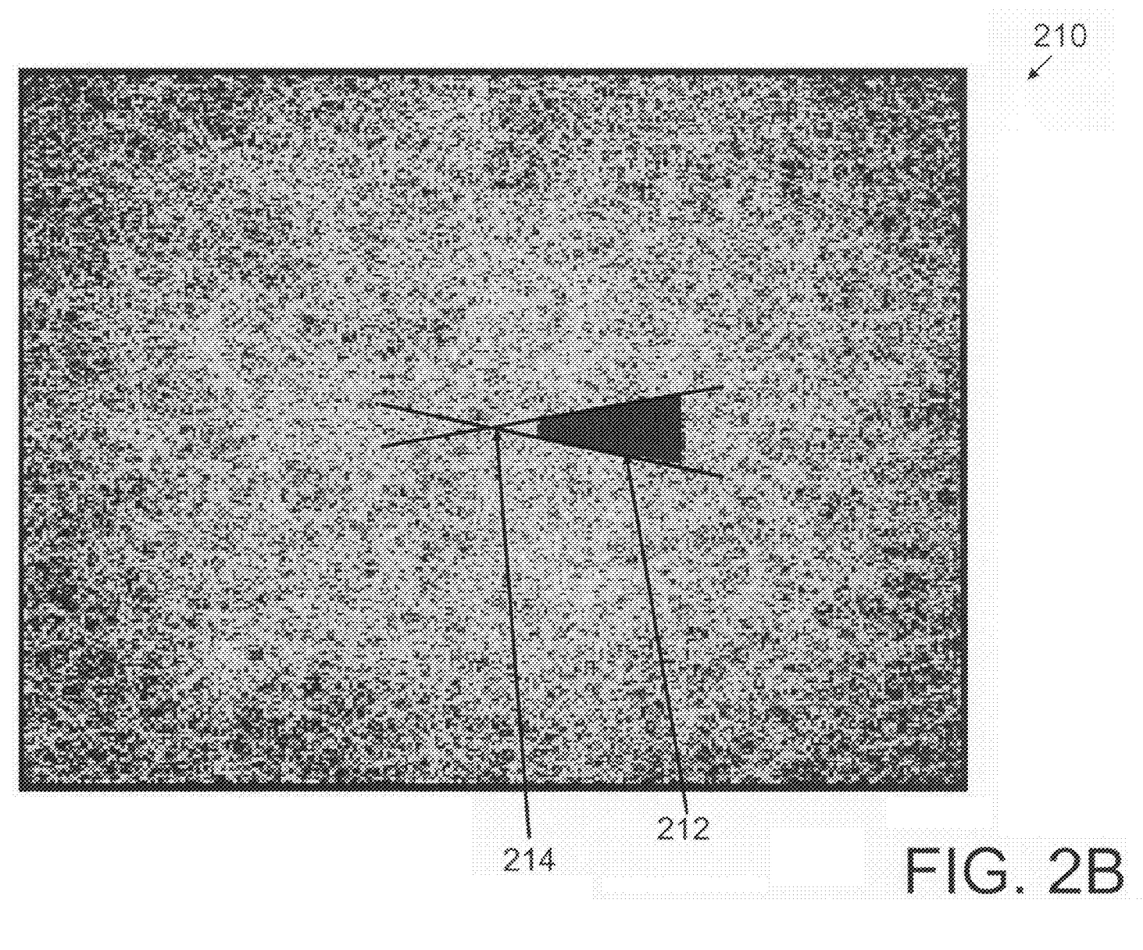
FIG. 2B illustrates an exemplary visibility map.

The spatial constraints that may be verified in block 206 may include for example, a point referenced in the geo-positional sensor data GS that lies in the visibility map. The visibility map may be constructed by incrementing points on the geo-referenced map when nothing is visible in the video camera 112. An exemplary visibility map 210 is shown in FIG. 2B. The field of view of the video camera 112 may take the form of a trapezoid 212. The video camera 112 may be located at an intersection 214 of two non-parallel sides of the trapezoid 212.

The spatiotemporal constraints that may be verified in block 206 may include, for example, a point observed in the geo-positional sensor data that may be stationary while a corresponding point observed in the video camera-derived data may be moving; a point observed in the geo-positional sensor data may be moving while a corresponding point observed in the video camera-derived data may be stationary; or a trajectory of an object observed in the geo-positional sensor data may conform to a straight line while a trajectory observed a corresponding object observed in the video camera may be curved.

In block 224, a filtering mechanism using, for example, a robust statistical estimation of model parameters, such as, for example, a Random Sample Consensus (RANSAC) algorithm, may be used on the identified object pairs to eliminate noisy pairs and estimate the homography that best describes the pairs. Generally, the RANSAC algoritm may be used to estimate parameters of a mathematical model from a set of observed data. A basic assumption is that the data consists of inliers, i.e., data points which can be explained by some set of model parameters, and outliers which are data points that do not fit the model. In addition to this, the data points may be subject to noise. The outliers may originate, for example, from extreme values of the noise or from erroneous measurements or incorrect hypotheses about the interpretation of data. Based on a set of inliers, RANSAC may estimate the parameters of a model that optimally explains or fits the data set.

In block 226, to estimate locations of simultaneous observation pairs, the joint probable density distribution $p(x_1,x_2)$ of spatial positions of simultaneous observations may be determined for the video camera and geo-positional sensor data VC, GS, where $(x_1,x_2)$ is the ordered observation object pair in the video camera and geo-positional sensor data VC, GS.

In block 228, the joint probability density function for simultaneous observations may be estimated. As an example, a Parzen window method may be used to estimate the joint probability density function. The Parzen window approach is a density estimation technique that, rather than imposing assumptions on the density function, allows direct approximation of the density in a non-parametric fashion. For example, given some data regarding a sample of population, the Parzen window method may be used to extrapolate the data to the entire population. For example, assume a sample C includes n d-dimensional data points $c_1, c_2, \ldots, c_n$ of a multi-variate distribution $p(c)$. An estimate $\hat{p}(c)$ of the joint probability density function may be calculated as:

$$\hat{p}(c) = \frac{1}{n}|B|^{-1/2}\sum_{i=1}^{n} K(B^{-1/2}(c-c_i)) \quad (1)$$

where the d-dimensional kernel $K(c)$ is a bounded function satisfying $\int K(c)dc=1$, B is a symmetric d×d band-width matrix, and c is a feature vector.

The band-width matrix B may be selected empirically (for example, by approximating band-width matrix B as a diagonal matrix) or may be estimated using different data-driven techniques as described, for example, in "Bandwidth Selection for Multivariate Kernel Density Estimation using MCMC," by Zhang X., et al., Computational Statistics and Data Analysis, 50(11), 3009-3031. Examples of kernel functions, $K(c)$ may include a normal, Epanechnikov, uniform, or triangle kernel.

The feature vector c, used for determining the joint probability density function etween the video camera data and geo-positional sensor data VC and GS, i.e., $p(x_1,x_2)$, may be a four dimensional vector, consisting of the x and y coordinates of simultaneous pairs observations in the video camera and geo-positional sensor.

In block 240, once the joint probable density distribution $p(x_1,x_2)$ of spatial positions of simultaneous observations is estimated, density modes $m_1, m_2, \ldots, m_k$ or modes with high simultaneous density in the video camera and geo-positional sensor data VC, GS may be determined, using, for example, a mean-shift based approach. According to the mean-shift based approach, a density mode $m_i$ may represent location pairs $(x_a,x_b)$ in the video camera and geo-positional sensor data VC, GS where the simultaneous density is high.

In block 250, weighting may be assigned to each density mode determined in block 240. Because the high simultaneous density might be a result of an intense density at one of the two locations and accidental alignment at the other, a correlation coefficient may be applied as a weight for each density mode. The sensor output may be modeled at each location $x_a$ as a binary random variable $X_a$, where $X_a=1$, if there is an observation at $x_a$ and $X_a=0$ otherwise. A weight $w(m_i)$ may be assigned to each mode $m_i=(x_a,x_b)$ equal to the Pearson correlation coefficient between the random variables $X_a$ and $X_b$:

$$w(m_i) = \frac{p(X_a, X_b) - p(X_a)p(X_b)}{p(X_a)p(X_b)(1-p(X_a))(1-p(X_b))} \quad (2)$$

In block 260, the weighted density modes may be provided.

Figure 3:
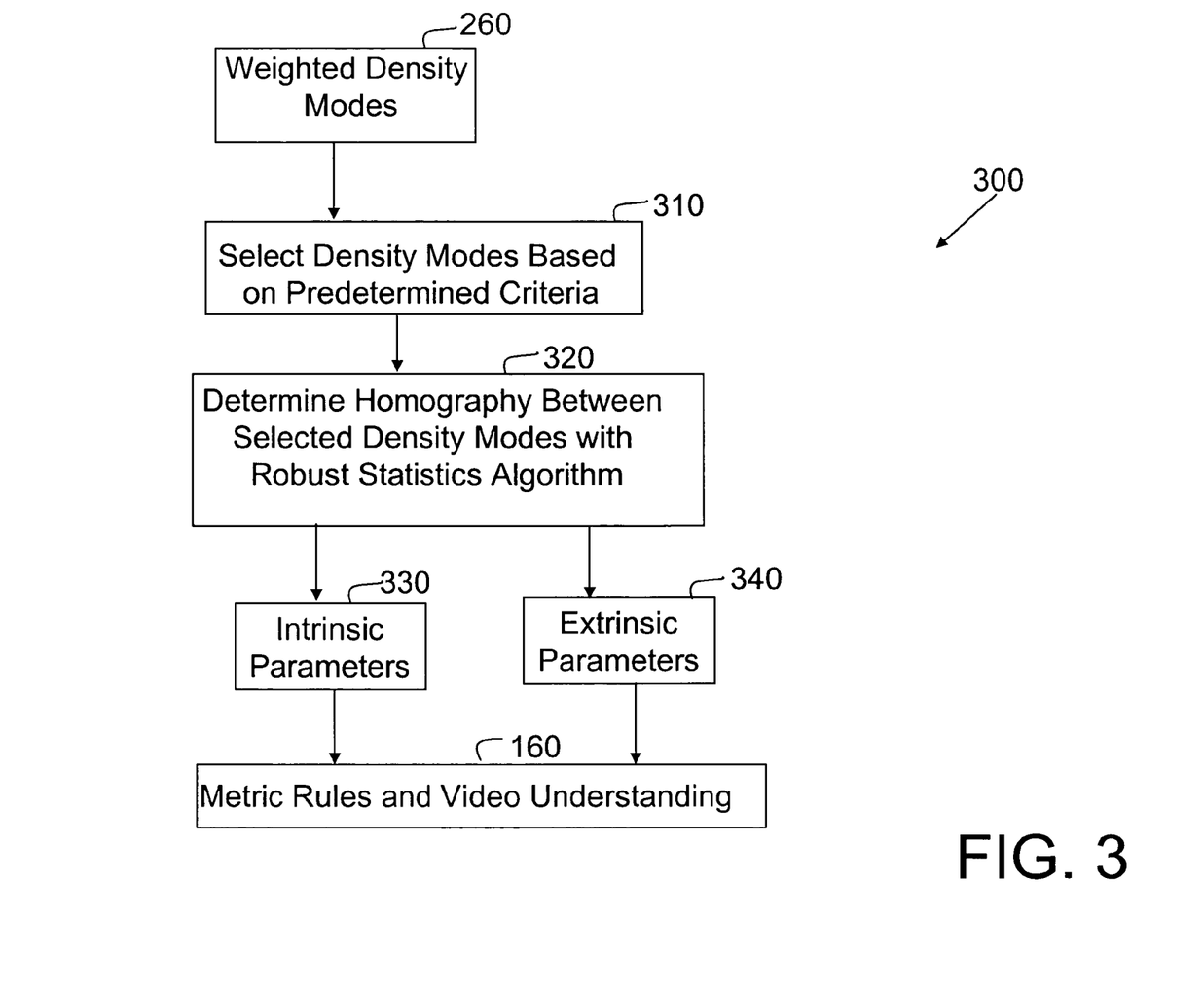
FIG. 3 illustrates another exemplary flowchart.

With continuing reference to FIG. 1 and further reference to FIG. 3, the camera calibration and geo-registration module 150 may use a technique 300. More specifically, the camera calibration and geo-registration module 150 may use the weighted density modes provided by the correspondence module 130 to determine a relationship between the field of view of the video camera 112 and the field of view of the geo-positional sensor 142. The relationship between the field of view of the video camera 112 and the field of view of the geo-positional sensor 142 may be represented in terms of the homography given, for example, by a 3×3 matrix H between corresponding points on the ground-plane of the two images. If p1 is a point on the ground-plane in the video camera data and p2 is a corresponding point (projection of the same world location as p1) on the ground-plane in the geo-positional sensor data, then p1=H*p2, where the points p1, p2 are the points of a homogeneous coordinate system. The homography H* may be obtained by solving a linear system determined by identifying four or more corresponding points in the two images that lie on the ground-plane in the video camera and geo-positional sensor data and do not form degenerate cases, such as, co-linearity.

In block 310, a number of top highly weighted density modes $m_1, m_2, \ldots, m_k$ in the joint probable density distribution $p(x_1,x_2)$ of spatial positions of simultaneous observations from the weighted density modes provided in block 260 by the correspondence module 130 may be selected. The density modes may be selected, for example, by selecting three highest weighted modes.

In block 320, a robust statistics algorithm, such as, for example, the RANSAC algorithm with the least median square algorithm, may be used to determine the homography H* that best fits the selected highly weighted modes. Such a technique is described, for example, in "Multiple view geometry in computer vision," by R. Hartley and A. Zisserman, 2003, pp. 107-110. The homography H* provides (a) intrinsic parameters 330 of the video camera 112, such as, for example, the focal length and the coordinates of the principal point, and (b) extrinsic parameters 340 of the video camera 112, such as, for example, the position and field of view. The position may include, for example, the latitude and longitude of the video camera 112, or be relative to a satellite image or a map. In one embodiment, the video camera field of view may be specified via, for example, a geographic information system (GIS) input, such as, for example, a satellite image, an electronic nautical chart (ENC), a digital line graph (DLG), a digital elevation map (DEM), a digital raster graphic (DRG), a digital orthophoto quadrangle (DOQ), a geologic map, or a geospatial information system input.

Referring back to FIG. 1, the metric rules and video understanding module 160 may use the metric rules and video understanding rules 156, 158 and the calibration and geo-registration information from the calibration and geo-registration module 150 and the target meta information from the target detection module 120 to geo-locate the targets, objects or events including target detection with a target detection module 170, target identification with a target identification module 172, target classification with a target classification module 174, target verification with a target verification module 176, and target tracking with a target tracking module 178. The mapping between the image coordinates in the video image camera to world locations may be specified by the determined homography H*, describing the relationship between the video camera field of view and the geo-positional sensor field of view. The target detection module 170 may detect targets using a background detection method, described, for example, in U.S. Pat. No. 6,999,600, identified above. The target identification module 172 may identify the detected targets with the incoming geo-positional data by using the calibration and geo-registration information. The target classification module 174 may perform classification of the targets by a number of techniques. Examples of such techniques include using a neural network classifier or using a linear discriminatant classifier described, for example, in "A system for video surveillance and monitoring," by Collins et al., technical report CMU-RI-TR-00-12, Robotics Institute, Carnegie Mellon University, May, 2000. The target verification module 176 may verify targets by comparing i) the target types sent by the target itself (through the geo-positional data) with the target type determined by the classification module, and ii) the metric size calculated by using the target detection, and calibration information with the size sent by the target. The target tracking module 178 may track targets using, for example a Kalman filter, applied to the centroids of the targets, or using some other technique as described, for example, in U.S. Published Patent Application No. 2005/0146605, or U.S. Published Patent Application No. 2006/0268111, identified above.

In the target detection module 170, mapping targets detected in the video sequence 110 to world locations may allow detecting, based on the metric rules 156, when targets, for example: (a) move too close to specified world locations; (b) move too close to a specified boundary; (c) move too far away from specified world locations, (d) move too far away from a specified boundary, (e) move too close to other moving targets, (f) move too far away from other moving targets, (g) travel faster than a specified speed, (h) travel slower than a specified speed, (i) exceed a specified size, (j) are smaller than a specified size; and (k) other like rules. The metric rules 156 may also be used to detect combinations of metric observations, such as, for example: (a) targets that move too fast for their size, given their current speed and heading and are likely to get too close to a specified world location within a specified time; or (b) targets that move too fast given their current speed and heading and are likely to breach a specified boundary within a specified time. The metric rules 156 may include, for example, the image centric rules described, for example, in U.S. Published Patent Application No. 2005/0162515, identified above. The metric rules 156 and video understanding rules 158 may, for example, also be implemented as image-based rules described in U.S. Published Patent Application No. 2005/0162515. For example, target meta information may be automatically combined with calibration and geo-registration information before the joint information is compared against rules specified by the operator of the system. Rule specification and matching process may, for example, also be implemented as described in U.S. Published Patent Application No. 2005/0162515.

Figure 4:
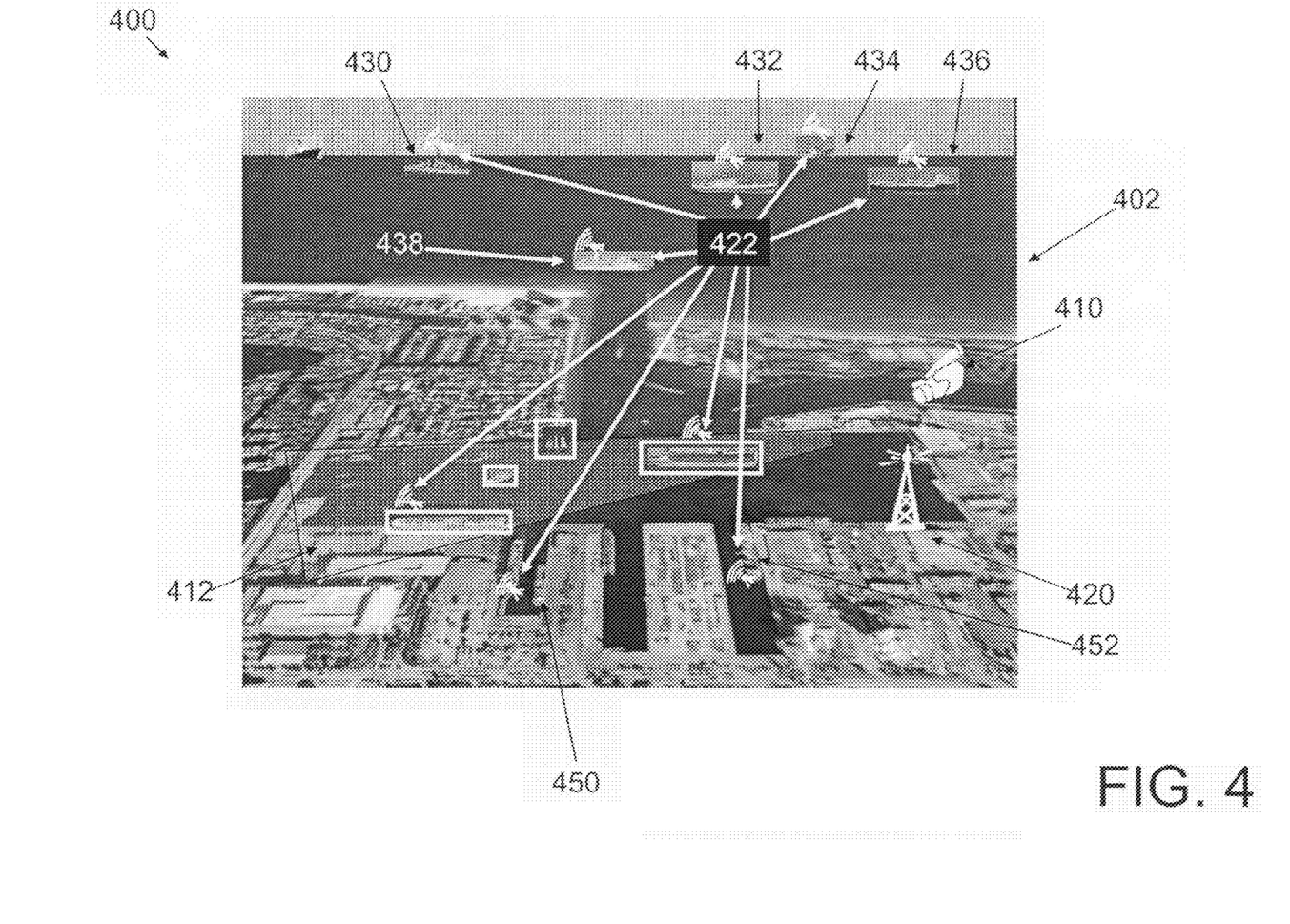
FIG. 4 illustrates an exemplary port surveillance scenario.

With continuing reference to FIG. 1 and particular reference to FIG. 4, this exemplary embodiment may include port surveillance and monitoring. Large ships may typically communicate their status and identification information through an automatic identification system (AIS). AIS may be used by ships and vessel traffic systems (VTS) principally for identification of ships at sea. The IMO (International Maritime Organization) regulations currently require an AIS transponder to be present aboard each ship of 300 gross tonnage and above engaged on international voyages, each cargo ship of 500 gross tonnage and above not engaged on international voyages, and all passenger ships irrespective of size. The AIS transponder may help to identify ships, which are not in sight (e.g., at night, in fog, in radar blind arcs or shadows or at distance), by transmitting identification (ID), position, course, speed and other ship data to all other nearby ships and VTS stations.

In an exemplary port surveillance scenario 400 of FIG. 4, the port basin 402 may be monitored by a video camera 112, such as video camera 410, which may detect moving objects in a camera field of view 412. The detected objects may include, for example, ships, boats, moving objects on land, airplanes and other objects in the camera field of view 412. As illustrated, the camera detected objects are designated by white boxes around them. Other ships, which are out of the camera field of view 412, are not detected by the video camera 410. A geo-positional sensor 142, such as an AIS receiver 420, may receive information broadcasted from each ship or object within a range of the AIS receiver 420 from a respective AIS transponder 422 of each ship. In FIG. 4, the reference numeral 422 and its several lead lines point to the AIS transponders in the port basin 402. The broadcast of the ship AIS transponder 422 may include information such as, for example, identification (ID), position, course, speed and other ship data. Although the AIS receiver 420 is illustrated as the only source of the geo-positional information, it is contemplated that many other sources of the geo-positional information may be used.

In one embodiment, the target geo-positional data 140 may be extracted from the information obtained, for instance, by the AIS receiver 420 and provided to the correspondence module 130. Based on the detections in the video sequence 110 by the target detection module 120 and the target geo-positional data 140 extracted by the AIS receiver 420, the camera calibration and geo-registration module 150 may calibrate the video camera 112 if it is known which detections correspond to which AIS reading and if enough of the correspondences are available. The number of correspondences required depends on the complexity of the image-to-world mapping model and thus on the number of parameters to be estimated. For example, a minimum of four such image-to-world correspondence pairs may be required to compute a planar homography (e.g., mapping model) of the image from the video camera with the geographical coordinates. In practice, the theoretical minimum number of correspondences may not be enough due to errors and inaccuracies in the measurement. More data may be required to achieve better accuracy. More complex mapping models may involve multiple planar surfaces or make use of geographical information systems or digital elevation maps to map image locations to three-dimensional world locations.

Although the AIS receiver 420 may receive the broadcast from the AIS-equipped ships within the range, only a small portion of this range may be visible in the camera field of view 412. For example, in FIG. 4, five ships 430, 432, 434, 436, 438 shown at sea and two ships 450, 452 shown in port are not in the field of view 412 of the video camera 410. Hence, a small number (or none in some situations) of the ships equipped with the AIS transponders 422 and detected by the AIS receiver 420 may be detected by the video processing system 100. In addition, much of the port-based activity may consist of small boats and recreational craft that are not usually equipped with AIS transponders. These vehicles may generate a significant amount of detections in the imaging system 100. However, these detections may have no corresponding data obtained by the AIS receiver 420.

Figure 5:
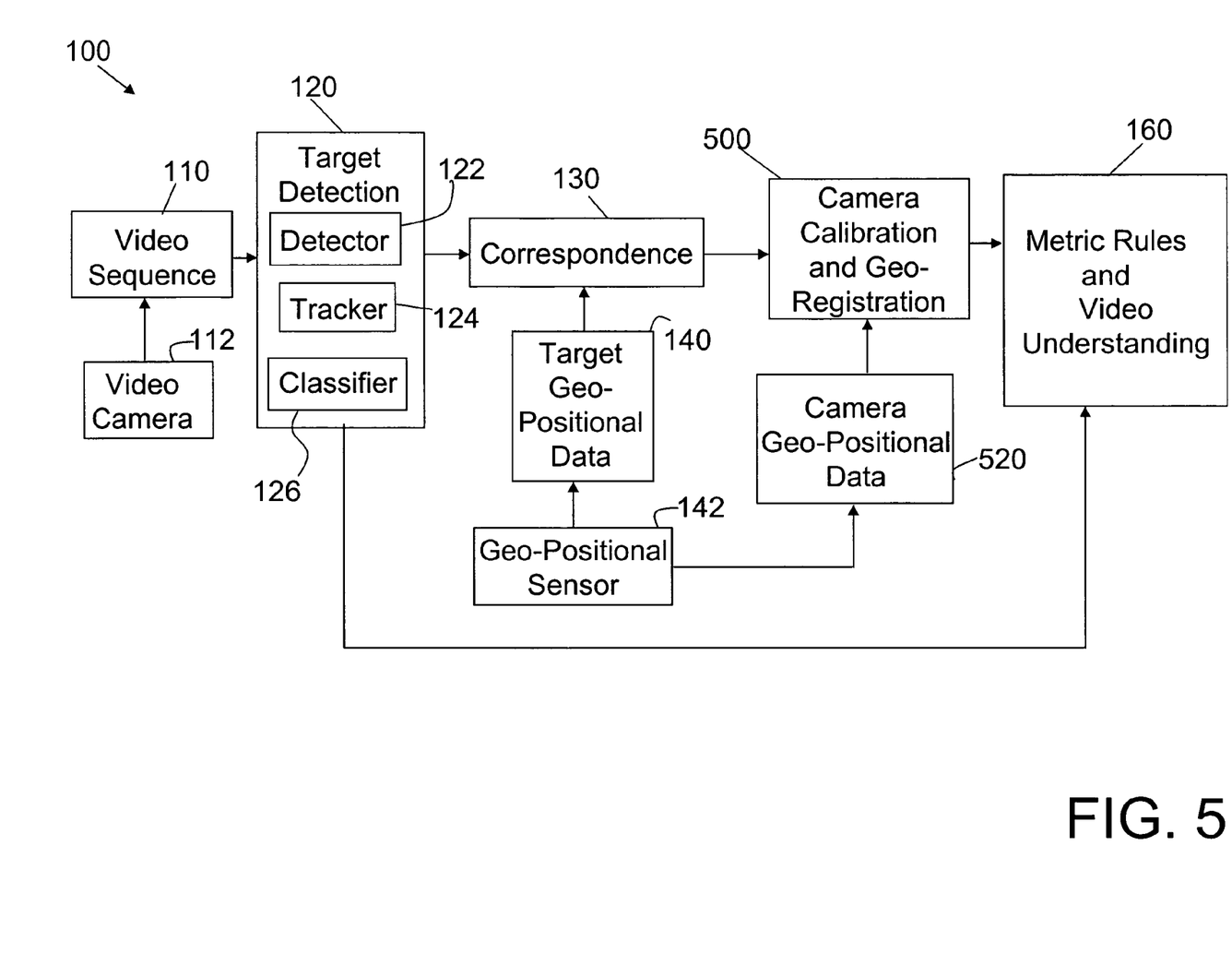
FIG. 5 illustrates another exemplary video processing system.

With reference to FIG. 5, this exemplary embodiment is similar to the embodiment of FIG. 1, except that the camera calibration and geo-registration module 150 is replaced by a camera calibration and geo-registration module 500, which uses a camera geo-positional data 520 and the correspondence information from the correspondence module 130 to improve the speed and/or accuracy of the calibration of the video camera 112. The camera geo-positional data 520 and the determined correspondences of target geo-positional data and targets detected in the video sequence 110 may be used for geo-registration. The camera geo-positional data 520 may be obtained from the geo-positional sensor or sensors 142. The availability of the camera geo-positional data 520 may reduce the search space of the camera calibration and geo-registration module 500. For example, instead of estimating the position, viewing direction and camera field of view from the information of the target detected in the video sequence 110 and the target geo-positional data 140, in this embodiment, only the viewing direction and camera field of view need to be estimated. Additionally, the availability of the camera geo-positional data 520 may reduce the amount of relevant data as the geo-positional data from distant targets may be ignored. The availability of the camera geo-positional data 520 may simplify the solution space and thus speed convergence or (if the number of correspondences is kept fixed) improve accuracy or both.

Figure 6:
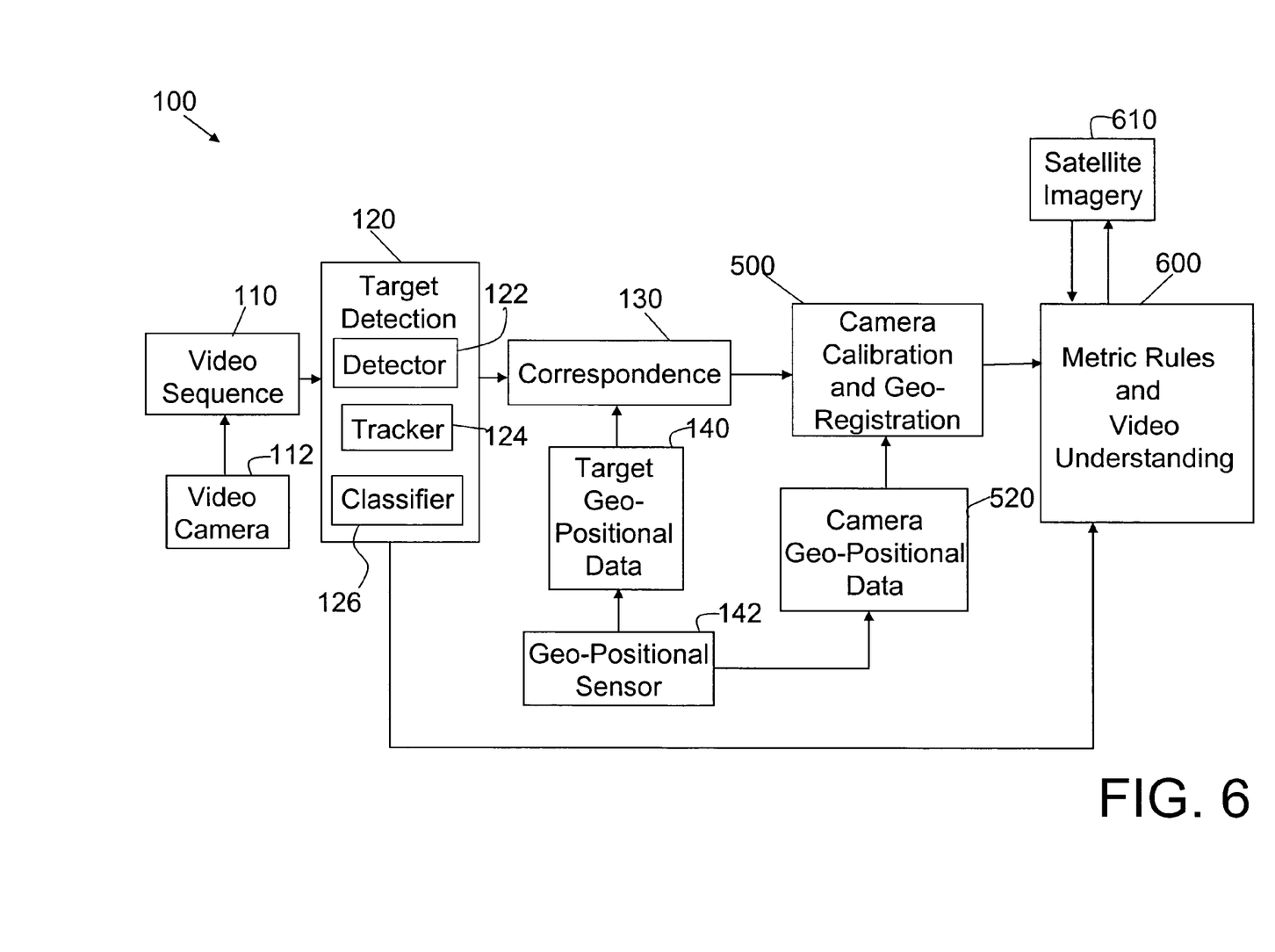
FIG. 6 illustrates another exemplary video processing system.

With reference to FIG. 6, this exemplary embodiment is similar to the embodiment of FIG. 5, except the metric rules and video understanding module 160 is replaced by a metric rules and video understanding module 600. The metric rules and video understanding module 600 may use the camera calibration and geo-registration information from the camera calibration and geo-registration module 500 and satellite imagery 610 for the visualization of targets on a satellite image. The target geo-positional data 140 may be fed through the correspondence and camera calibration and geo-registration modules 130, 500 to the metric rules and video understanding module 600 and may be used to indicate the targets on the satellite imagery 610.

Figure 7:
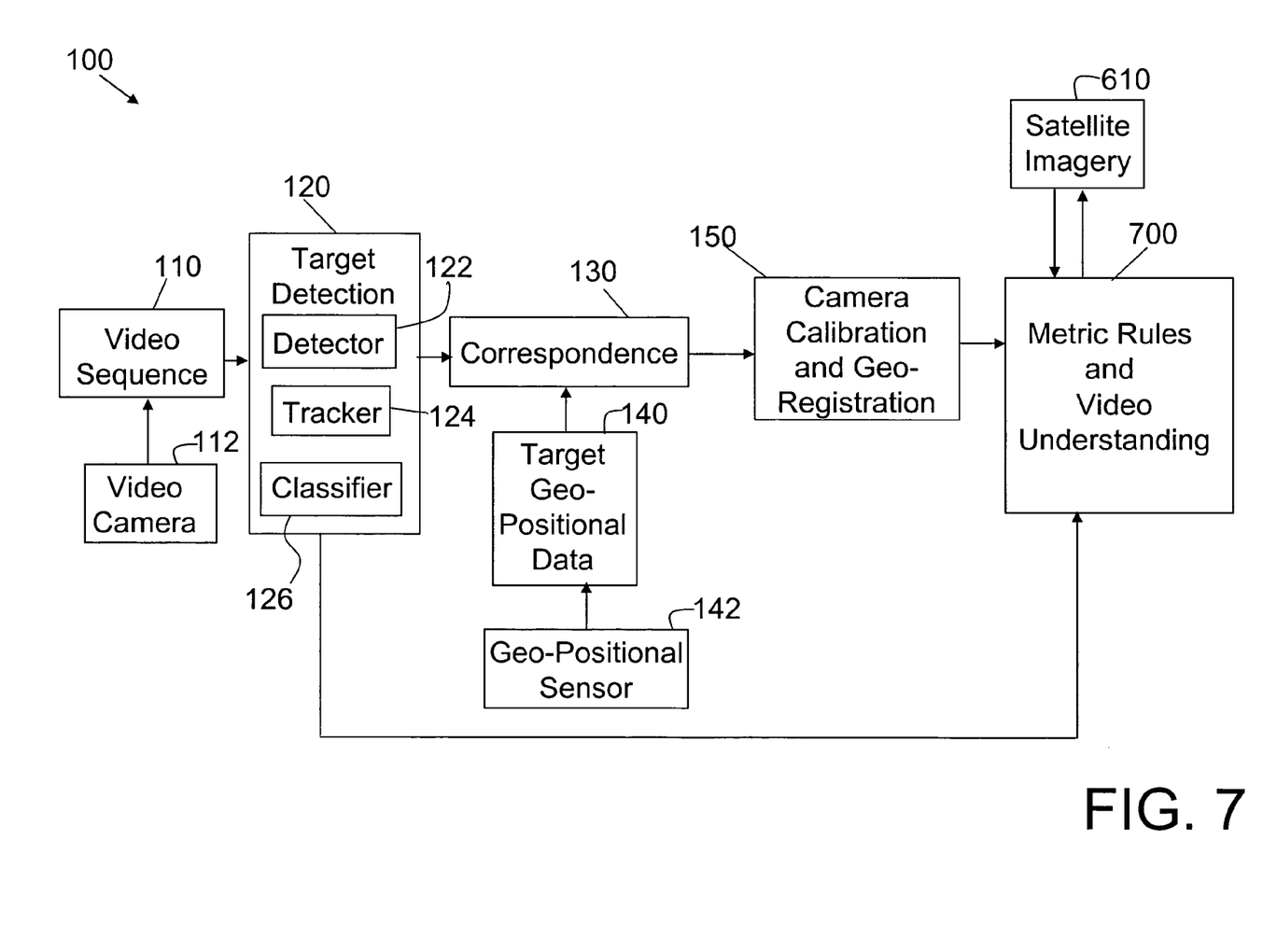
FIG. 7 illustrates another exemplary video processing system.

FIG. 7 illustrates another exemplary embodiment, which enables target visualization similarly to the embodiment of FIG. 6 but without using the camera geo-positional data. The embodiment of FIG. 7 is similar to the embodiment of FIG. 1, except that the satellite imagery 610 is provided to a metric rules and video understanding module 700.

With reference again to FIGS. 1, 4, 5, 6 and continuing reference to FIG. 7, for port surveillance and monitoring, the calibration and geo-registration of one or more video cameras 112 by the camera calibration and geo-registration module 150, 500 provides a number of benefits. The learned camera-view-to-world mapping may allow the target verification 180 to verify the ship identities advertised by the ship AIS transponders 422. For example, the advertised ship geo-position, size, speed and heading, for example, may be compared to the ship geo-position, size, speed and heading detected in the video sequence 110. Furthermore, the camera-view-to-world mapping obtained via calibration and geo-registration of the video cameras 410 may provide geo-positional, size, speed and heading information for the ships that do not transmit geo-positional data (e.g., AIS).

In addition to the described above port surveillance and monitoring, the described above may be used for other applications, such as, for example: port security; video understanding; perimeter and border security; site model building; traffic monitoring; and the like. Other applications will become apparent to those of ordinary skill in the art.

For video understanding, the mensuration of the targets obtained from the metric rules and video understanding module 160, 600, 700 may be used to improve the analysis of a video sequence. The world position, size, speed, and heading of targets provide contextual information that may be used to improve various components of video analysis systems. For example, the target detection may benefit from target geo-positional information. Using the embodiments of FIG. 6 or 7, the target geo-positional information may indicate that a target travels on water. If this information is made available to the target detection 170, the target detection 170 may be tuned to improve target detection. As another example, the target detection 170 may benefit from target speed and heading information by sensitizing the target detection in the path of the target. As yet another example, the target tracking 182 may benefit from target size information to estimate the inertia of the target. Inertia prevents larger targets from changing direction quickly. This information may be used when the tracker must resolve target occlusions. As yet another example, the target size may benefit the target classification 176. If for instance the size of a target is known to be four meters, the target classification 176 may eliminate the following target type hypotheses, for example: human, semi-trailer truck, cruise ships, cargo vessels, etc.

For security and video surveillance, the detection of video events and threats by the metric rules and video understanding module 160, 600, 700 may be improved by using, for example, actual position, speed, heading, and size of moving targets, and/or estimated time of collision or impact.

For traffic monitoring, the calibration and geo-registration of one or more video cameras 112 with the camera calibration and geo-registration module 150, 500 provides actual target speeds, while uncalibrated video cameras may only provide image speeds and headings. Calibrated and geo-registered video cameras may, for example, detect speeding vehicles, running people, drifting boats, oversize vehicles, wrong way traffic, or illegal access by targets that violate these properties or their combinations.

Figure 8:
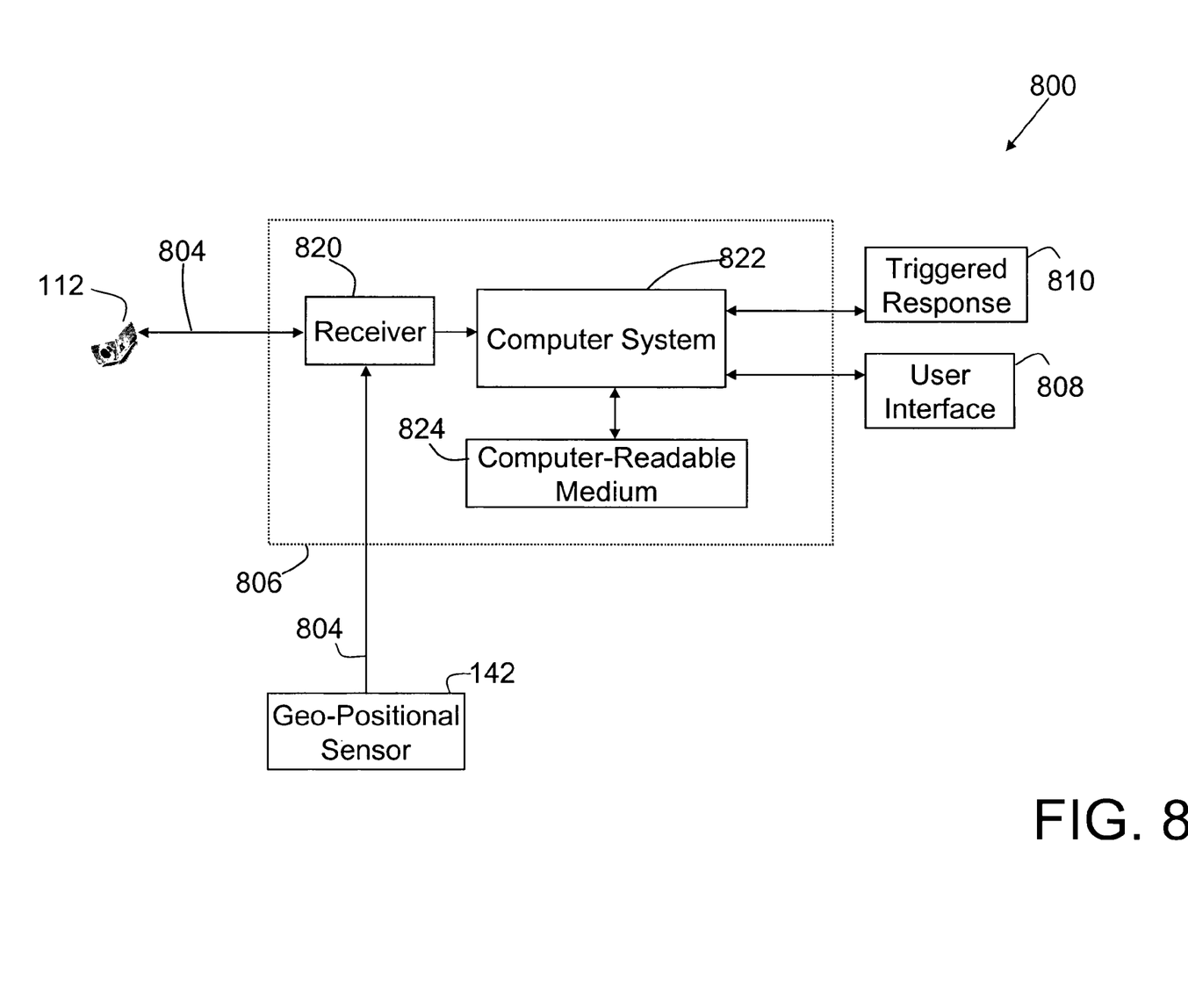
FIG. 8 illustrates another exemplary system according to an exemplary video processing system.

FIG. 8 depicts another exemplary video processing system. The video processing system 800 may include the video camera or cameras 112 the geo-positional sensor or sensors 142, a communication medium 804, an analysis system 806, a user interface 808, and a triggered response 810. The video camera 112 may be trained on a video monitored area and may generate output signals. In an exemplary embodiment, the video camera 112 may be positioned to perform surveillance of an area of interest. In addition to the target geo-positional data received from the geo-positional sensor 142, the video processing system 800, similarly to the described above, may receive target geo-positional data from one or more objects which transmit target geo-positional information in the environment, such as, for example, geographic information system (GIS) input, such as a satellite image, an electronic nautical chart (ENC), a digital line graph (DLG), a digital elevation map (DEM), a digital raster graphic (DRG), a digital orthophoto quadrangle (DOQ), or a geologic map.

In an exemplary embodiment, the video camera 112 may be equipped to be remotely moved, adjusted, and/or controlled. With such video cameras, the communication medium 804 between the video camera 112 and the analysis system 806 may be bi-directional, and the analysis system 806 may direct the movement, adjustment, and/or control of the video camera 112.

In an exemplary embodiment, the video camera 112 may include multiple video cameras monitoring the same video monitored area.

In an exemplary embodiment, the video camera 112 may include multiple video cameras monitoring multiple video monitored areas.

The communication medium 804 may transmit the output of the video camera 112 and/or the geo-positional sensor 142 to the analysis system 806. The communication medium 804 may be, for example: a cable; a wireless connection; a network (e.g., a number of computer systems and associated devices connected by communication facilities; permanent connections (e.g., one or more cables); temporary connections (e.g., those made through telephone, wireless, or other communication links); an internet, such as the Internet; an intranet; a local area network (LAN); a wide area network (WAN); a combination of networks, such as an internet and an intranet); a direct connection; an indirect connection). If communication over the communication medium 804 requires modulation, coding, compression, or other communication-related signal processing, the ability to perform such signal processing may be provided as part of the video camera 112 and/or separately coupled to the video camera 112. The same or different communication mediums 804 may be used for any or all video cameras 112 and any or all of the geo-positional sensors 142.

The analysis system 806 may perform analysis tasks, including necessary processing according to the invention. For example, the analysis system 806 may perform the tasks described above for the modules 120, 130, 150, 160, 500, 600, and/or 700 illustrated in FIGS. 1, 5, 6, 7. The analysis system 806 may include a receiver 820, a computer system 822, and a computer-readable medium 824.

The receiver 820 may receive the output signals of the video camera or cameras 112 and geo-positional sensor or sensors 142 via the communication medium 804. If the output signals of the video camera 112 and/or geo-positional sensor 142 have been modulated, coded, compressed, or otherwise communication-related signal processed, the receiver 820 may be able to perform demodulation, decoding, decompression or other communication-related signal processing to obtain the output signals from the video camera 112 and/or geo-positional sensor 142, or variations thereof due to any signal processing. Furthermore, if the signals received from the communication medium 804 are in analog form, the receiver 820 may be able to convert the analog signals into digital signals suitable for processing by the computer system 822. The receiver 820 may be implemented as a separate block (shown) and/or integrated into the computer system 822. Also, if it is unnecessary to perform any signal processing prior to sending the signals via the communication medium 804 to the computer system 822, the receiver 820 may be omitted.

The computer system 822 may be coupled to the receiver 820, the computer-readable medium 824, the user interface 808, and the triggered response 810. The computer system 822 may perform analysis tasks, including necessary processing according to the invention.

The computer-readable medium 824 may include all necessary memory resources required by the computer system 822 for the invention and may also include one or more recording devices for storing signals received from the communication medium 804 and/or other sources. The computer-readable medium 824 may be external to the computer system 822 (shown) and/or internal to the computer system 822.

The user interface 808 may provide input to and may receive output from the analysis system 806. The user interface 808 may include, for example, one or more of the following: a monitor; a mouse; a keyboard; a keypad; a touch screen; a printer; speakers and/or one or more other input and/or output devices. The user interface 808, or a portion thereof, may be wirelessly coupled to the analysis system 806. Using user interface 808, a user may provide inputs to the analysis system 806, including those needed to initialize the analysis system 106, provide input to analysis system 806, and receive output from the analysis system 806.

The triggered response 810 may include one or more responses triggered by the analysis system. The triggered response 810, or a portion thereof, may be wirelessly coupled to the analysis system 806. Examples of the triggered response 810 include: initiating an alarm (e.g., audio, visual, and/or mechanical); sending a wireless signal; controlling an audible alarm system (e.g., to notify the target, security personnel and/or law enforcement personnel); controlling a silent alarm system (e.g., to notify security personnel and/or law enforcement personnel); accessing an alerting device or system (e.g., pager, telephone, e-mail, and/or a personal digital assistant (PDA)); sending an alert (e.g., containing imagery of the violator, time, location, etc.) to a guard or other interested party; logging alert data to a database; taking a snapshot using the video camera 112 or another camera; culling a snapshot from the video obtained by the video camera 112; recording video with a video recording device (e.g., an analog or digital video recorder); controlling a PTZ camera to zoom in to the target; controlling a PTZ camera to automatically track the target; performing recognition of the target using, for example, biometric technologies or manual inspection; closing one or more doors to physically prevent a target from reaching an intended target and/or preventing the target from escaping; controlling an access control system to automatically lock, unlock, open, and/or close portals in response to an event; or other responses.

In an exemplary embodiment, the analysis system 806 may be part of the video camera 112. For this embodiment, the communication medium 804 and the receiver 820 may be omitted. The computer system 822 may be implemented with application-specific hardware, such as a DSP, a FPGA, a chip, chips, or a chip set to perform the invention. The user interface 808 may be part of the video camera 112 and/or coupled to the video camera 112. As an option, the user interface 808 may be coupled to the computer system 822 during installation or manufacture, removed thereafter, and not used during use of the video camera 112. The triggered response 880 may be part of the video camera 112 and/or coupled to the video camera 112.

In an exemplary embodiment, the analysis system 806 may be part of an apparatus, such as the video camera 112 as discussed in the previous paragraph, or a different apparatus, such as a digital video recorder or a router. For this embodiment, the communication medium 804 and the receiver 820 may be omitted. The computer system 822 may be implemented with application-specific hardware, such as a DSP, a FPGA, a chip, chips, or a chip set to perform the invention. The user interface 808 may be part of the apparatus and/or coupled to the apparatus. As an option, the user interface 808 may be coupled to the computer system 822 during installation or manufacture, removed thereafter, and not used during use of the apparatus. The triggered response 880 may be part of the apparatus and/or coupled to the apparatus.

The above has been described in detail with respect to the exemplary embodiments, and it will now be apparent from the foregoing to those skilled in the art that changes and modifications may be made without departing from the described in its broader aspects. The invention, therefore, as defined in the appended claims, is intended to cover all such changes and modifications as fall within the true spirit of the invention.

We claim:

1. A non-transitory computer-readable medium comprising software for video processing, which when executed by a computer system, cause the computer system to perform operations comprising a method of:
    receiving a video sequence of a field of view within an environment;
    detecting targets in the video sequence;
    receiving target geo-positional information transmitted by a geo-positional sensor; and
    determining, using at least one processor of the computer system, correspondences between the targets detected in the video sequence and the target geo-positional information,
    wherein determining the correspondences comprises:
        determining corresponding pairs of targets detected in the video sequence and received target geo-positional information based on a predetermined criteria;
        determining a probability density function of joint distribution of spatial positions of each determined corresponding pair; and
        estimating high joint density modes.

2. The non-transitory computer-readable medium as set forth in claim 1, wherein the method further comprises:
    receiving geo-positional information regarding a video camera that generated the video sequence, wherein the correspondences are further determined based on the geo-positional information of the video camera that generated the video sequence.

3. The non-transitory computer-readable medium as set forth in claim 1, wherein the method further comprises:
    receiving geo-positional target information from a global positioning system (GPS) transmitter.

4. The non-transitory computer-readable medium as set forth in claim 1, wherein the method further comprises:
    receiving geo-positional target information from an automatic identification system (AIS) transmitter.

5. The non-transitory computer-readable medium as set forth in claim 1, wherein the method further comprises:
    receiving geo-positional target information from a blue force tracker (BFT) transmitter.

6. The non-transitory computer-readable medium as set forth in claim 1, wherein the method further comprises:
    receiving geo-positional target information from a cell phone.

7. The non-transitory computer-readable medium as set forth in claim 1, wherein the method further comprises:
    receiving geo-positional target information from a radio frequency identification (RFID) tag.

8. The non-transitory computer-readable medium as set forth in claim 1, wherein the method further comprises:
    estimating at least one intrinsic parameter or at least one extrinsic parameter of a video camera that generated the video sequence based on the determined correspondences.

9. The non-transitory computer-readable medium as set forth in claim 1, wherein the method further comprises:
    geo-registering the field of view of a video camera that generated the video sequence based at least on the determined correspondences.

10. The non-transitory computer-readable medium as set forth in claim 1, wherein the method further comprises:
    geo-registering the field of view of a video camera that generated the video sequence based on geographic imaging system imagery of the environment.

11. The non-transitory computer-readable medium as set forth in claim 10, wherein the geographic imaging system imagery comprises satellite imagery.

12. The non-transitory computer-readable medium as set forth in claim 10, wherein the geographic imaging system imagery comprises nautical charts.

13. The non-transitory computer-readable medium as set forth in claim 10, wherein the geographic imaging system imagery comprises electronic nautical charts.

14. The non-transitory computer-readable medium as set forth in claim 10, wherein the geographic imaging system imagery comprises Digital Elevation Maps.

15. The non-transitory computer-readable medium as set forth in claim 10, wherein the geographic imaging system imagery comprises a geospatial information system input.

16. The non-transitory computer-readable medium as set forth in claim 1, wherein the method further comprises:
    determining a measurement of at least one of the target or the environment based on the determined correspondences.

17. The non-transitory computer-readable medium as set forth in claim 1, wherein the method further comprises:
    weighting the density modes with correlation coefficients;
    selecting a predetermined number of higher weighted density modes; and
    determining homography for the selected higher weighted density modes.

18. The non-transitory computer-readable medium as set forth in claim 1, wherein the method further comprises:
    based on the determined correspondences, at least one of:
        detecting a target,
        identifying a target,
        classifying a target,
        verifying a target, or
        tracking a target.

19. The non-transitory computer-readable medium as set forth in claim 1, wherein the method further comprises:
    comparing the target geo-positional information to meta information of a corresponding target detected in the video sequence to obtain a comparison result; and
    at least one of identifying or verifying at least one of the target detected in the video sequence or target geo-positional information based on the comparison result.

20. The method as set forth in claim 1, further comprising:
    weighting the density modes with correlation coefficients;
    selecting a predetermined number of higher weighted modes; and
    determining homography for the selected higher weighted modes.

21. A computer-based system to perform a method for video processing, the method comprising:
    receiving a video sequence of a field of view within an environment;
    detecting targets in the video sequence;
    receiving target geo-positional information transmitted by a geo-positional sensor; and
    determining, using at least one processor of the computer-based system, correspondences between the targets detected in the video sequence and the target geo-positional information,
    wherein determining the correspondences comprises:
        determining corresponding pairs of targets detected in the video sequence and received target geo-positional information based on a predetermined criteria;
        determining a probability density function of joint distribution of spatial positions of each determined corresponding pair; and
        estimating high joint density modes.

22. The system as set forth in claim 21, wherein the method further comprises:
receiving geo-positional information regarding a video camera that generated the video sequence, wherein the correspondences are further determined based on the geo-positional information of the video camera that generated the video sequence.

23. The system as set forth in claim 21, wherein the method further comprises:
estimating at least one intrinsic, or at least one extrinsic parameter of a video camera that generated the video sequence based on the determined correspondences.

24. The system as set forth in claim 21, wherein the method further comprises:
geo-registering the field of view of a video camera that generated the video sequence based at least on the determined correspondences.

25. The system as set forth in claim 21, further comprising:
geo-registering the field of view of a video camera that generated the video sequence based on geographic imaging system imagery of the environment.

26. The system as set forth in claim 25, wherein the geographic imaging system imagery comprises satellite imagery.

27. The system as set forth in claim 21, wherein the method further comprises:
determining measurements of at least one of the target or the environment based on the determined correspondences.

28. The system as set forth in claim 21, wherein the method further comprises:
weighting the density modes with correlation coefficients;
selecting a predetermined number of higher weighted density modes; and
determining homography for the selected higher weighted density modes.

29. The system as set forth in claim 21, wherein method further comprises:
based on the determined the determined correspondences, at least one of:
detecting a target,
identifying a target,
classifying a target,
verifying a target, or
tracking a target.

30. The system as set forth in claim 21, wherein the method further comprises:
comparing the target geo-positional information to meta information of a corresponding target detected in the video sequence to obtain a comparison result; and
at least one of identifying or verifying at least one of the target detected in the video sequence or target geo-positional information based on the comparison result.

31. A method for video processing, comprising:
receiving a video sequence of a field of view within an environment;
detecting targets in the video sequence;
receiving target geo-positional information transmitted by a geo-positional sensor; and
determining, using at least one processor, correspondences between the targets detected in the video sequence and the target geo-positional information,
wherein determining the correspondences comprises:
determining corresponding pairs of targets detected in the video sequence and received target geo-positional information based on a predetermined criteria;
determining a probability density function of joint distribution of spatial positions of each determined corresponding pair; and
estimating high joint density modes.

32. The method as set forth in claim 31, further comprising:
receiving geo-positional information regarding a video camera that generated the video sequence, wherein the correspondences are further determined based on the geo-positional information of the video camera that generated the video sequence.

33. The method as set forth in claim 31, further comprising:
estimating at least one intrinsic parameter, or at least one extrinsic parameter of a video camera that generated the video sequence based on the determined correspondences.

34. The method as set forth in claim 31, further comprising:
geo-registering the field of view of a video camera that generated the video sequence based at least on the determined correspondences.

35. The method as set forth in claim 31, further comprising:
geo-registering the field of view of a video camera that generated the video sequence based on geographic imaging system imagery of the environment.

36. The method as set forth in claim 35, wherein the geographic imaging system imagery comprises satellite imagery.

37. The method as set forth in claim 31, further comprising:
determining a measurement of at least one of the target or the environment based on the determined correspondences.

38. The method as set forth in claim 31, further comprising:
based on the determined the determined correspondences, at least one of:
detecting a target,
identifying a target,
classifying a target,
verifying a target, or
tracking a target.

39. The method as set forth in claim 31, further comprising:
comparing the target geo-positional information and meta information of a corresponding target detected in the video sequence to obtain a comparison result; and
at least one of identifying or verifying at least one of the target detected in the video sequence or target geo-positional information based on the comparison result.

40. An apparatus to perform the video processing method of claim 31.

41. A system to perform video processing of a video sequence generated by at least one video camera having a field of view within an environment, comprising:
a correspondence module to determine, using application specific hardware or at least one processor, correspondences between targets detected in the video sequence and corresponding target geo-positional information transmitted by a geo-positional sensor; and
at least one of:
a calibration and geo-registration module to determine a relationship between the video camera and geo-positional sensor and geo-register the video camera based at least on the determined correspondences; or
a metric rules and video understanding module to obtain measurement information regarding at least one of the environment or target detected in the video sequence,
wherein determining the correspondences comprises:
determining corresponding pairs of targets detected in the video sequence and received target geo-positional information based on a predetermined criteria;

determining a probability density function of joint distribution of spatial positions of each determined corresponding pair; and estimating high joint density modes.

42. The system as set forth in claim 41, comprising both of:

the calibration and geo-registration module to determine the relationship between the video camera and geo-positional sensor and geo-register the video camera based at least on the determined correspondences; and the metric rules and video understanding module to obtain measurement information regarding at least one of the environment or target detected in the video sequence.

* * * * *